United States Patent
Young

(10) Patent No.: US 10,445,167 B1
(45) Date of Patent: Oct. 15, 2019

(54) AUTOMATED METHOD AND SYSTEM FOR DIAGNOSING LOAD PERFORMANCE ISSUES

(71) Applicant: AMAZON TECHNOLOGIES, INC., Reno, NV (US)

(72) Inventor: Lawrence Shao-Shien Young, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 630 days.

(21) Appl. No.: 14/731,339

(22) Filed: Jun. 4, 2015

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0769* (2013.01)

(58) Field of Classification Search
CPC . G06F 11/079; G06F 11/0709; G06F 11/0769
See application file for complete search history.

(56) References Cited

U.S. PATENT DOCUMENTS

2014/0229608 A1* 8/2014 Bauer ................... H04L 41/142
709/224

* cited by examiner

*Primary Examiner* — Marc Duncan
*Assistant Examiner* — Jonathan D Gibson
(74) *Attorney, Agent, or Firm* — Blank Rome LLP

(57) ABSTRACT

A system includes multiple computing nodes. Each node includes a processor and memory. The computing nodes comprise a plurality of instances of an application, a networking device and a health service. The networking device is configured to receive requests directed to the application instances, to distribute the requests across the application instances, and, for each request, to determine a status code and an elapsed time value and store the status codes and elapsed time values for the request in a log. The health service is configured to provide error rate and average or percentile latency metrics based on request status codes and elapsed time values from the log. The metrics comprise a first set of error rate and average or percentile latency metrics associated with the networking device and a second set of error rate and average or percentile latency metrics associated with the application instances.

19 Claims, 5 Drawing Sheets

| | | CLIENT | LOAD BALANCER | | BACKEND INSTANCE |
|---|---|---|---|---|---|
| | | 310 | 312 | 314 | 316 |
| 302 → ERROR RATE: | | | | | |
| | CLIENT REQS | - | 0% | - | 7% |
| | CUSTOMER-CONTROLLABLE SYNTH REQS | 0% (330) | 3% | - | 15% |
| | SERVICE PROV'R-CONTROLLABLE SYNTH REQS | 0% | 0% | - | 0% |
| 322 → LATENCY: | | | | | |
| | CLIENT REQS | - | 0.5 ms | 25 ms | 85 ms |
| | CUSTOMER-CONTROLLABLE SYNTH REQS | 2 ms (332) | 0.4 ms | 7 ms | 50 ms |
| | SERVICE PROV'R-CONTROLLABLE SYNTH REQS | 1 ms | 0.5 ms | 1 ms | 2 ms |

PERFORMANCE METRICS (300)

FIG. 3

AUTOMATED METHOD AND SYSTEM FOR DIAGNOSING LOAD PERFORMANCE ISSUES

BACKGROUND

As an increasing number of applications and services are being made available over networks such as the Internet, an increasing number of service providers are turning to technologies such as cloud computing. In general, cloud computing is an approach to providing access to remote resources through a network. Such resources may include hardware and/or software. Hardware resources may include computers (e.g., servers), mass storage devices, and other useful hardware elements. Software resources may include operating systems, databases, etc. Customers of the service provider can create and manage virtual machines using the service provider's resources and load customer-specific software applications on such virtual machines. The customer then may pay for use of the service provider's resources rather than owning and operating his or her own hardware and software resources.

As with any computer network, performance is an issue. All else being equal, lower latencies and fewer errors are preferred over higher latencies and/or a higher number of errors. In the context of a customer using remote resources of a service provider, the customer may not have much control over and insight into the internal operations of the remote resources. Consequently, performance problems of the remote resources may be difficult to detect and diagnose by the customers. Such problems also may be difficult to detect and diagnose by the service provider because the service provider may have numerous (e.g., hundreds, thousands, or tens of thousands) customers using the service providers' resources and thus individually monitoring the resources used by each customer may be cumbersome and difficult.

BRIEF DESCRIPTION OF THE DRAWINGS

For a detailed description of various examples, reference will now be made to the accompanying drawings in which:

FIG. 3 shows a method for computing performance metrics in accordance with various implementations;

DETAILED DESCRIPTION

Figure 1:
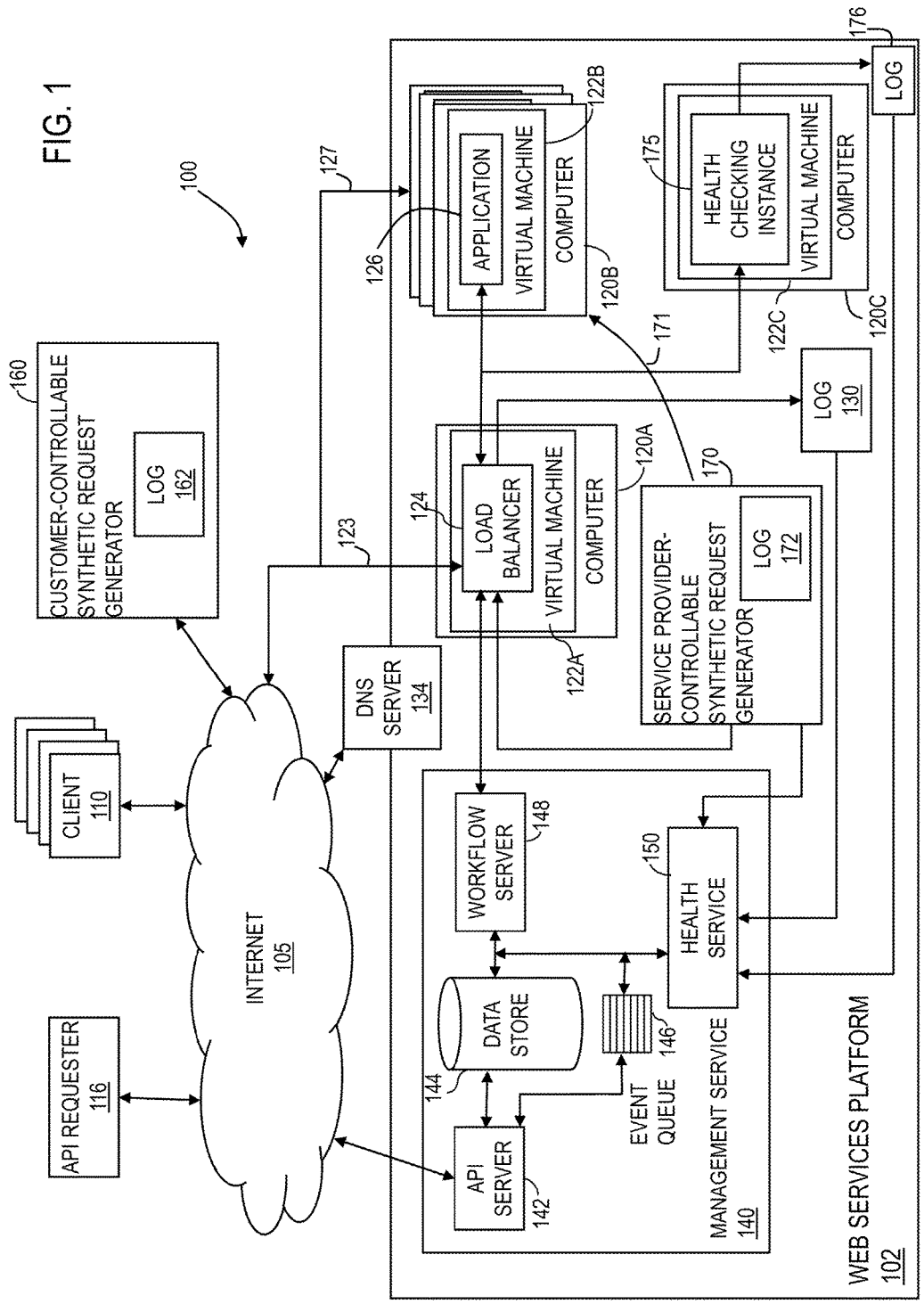
FIG. 1 shows a system permitting customers to configure instances on a service provider's web services platform and providing background performance metric determination in accordance with various implementations.

The following description is directed to determining and reporting performance metrics in web service platforms of service providers. The disclosed web services platform offers hardware and software resources that can be used by customers, thereby negating the need for the customers themselves to own and operate their own hardware and software resources. The disclosed web services platform computes performance metrics of the resources used by customers and does so as a background process thereby freeing the customers from having to manually process raw performance-related data to diagnose problems with the virtual machines running on the web services platforms. The computation of the performance metrics thus is performed automatically (i.e., without customer involvement) during run-time of the customer's applications. The performance metrics that are computed automatically for the customer permit the customer to have insight into the performance of the resources to which the customer has access. The disclosed performance metrics permit the customer to identify, for example, whether the performance of the web services platform has been degraded and whether such degradation is unique to those resources that the customer uses or whether the degradation is present across the entire web services platform.

In some embodiments, a customer can access the service provider's web services platform to create and manage one or more applications (also called "application instances" or "backend instances"). Such application instances may be created on a virtual machine ("VM"), which itself is implemented on a physical machine such as a server. The application instances execute the customer's software to provide the functionality desired by the customer such as, for example, hosting the customer's website. The customer might have a sufficiently large amount of client traffic that multiple instances of the customer's application software are needed to handle the traffic. As such, the customer also may use the service provider's network to create a networking device such as a load balancer to distribute the customer's incoming traffic across the customer's backend application instances. The load balancer receives incoming requests and distributes the requests to the application instances according to any one of a number of algorithms (e.g., round robin, least outstanding request, etc.). Responses from the application instances may pass back through the load balancer to the client that initiated the request. The load balancer thus may receive and forward packets in both directions—requests from client to application instance and responses from application instance to client.

Errors and latency can creep into the network traffic at any of multiple points along the communication path. For instance, latency and/or errors may occur during any one or more of the following communication points:

Initial request being provided from the client to the load balancer;

Request forwarded from the load balancer to the application instance; and

Response from application instance to the load balancer and forwarded back to the client. The disclosed embodiments provide a system that computes performance metrics for a service provider network and does so as a background process. The customer is able to access and view the metrics whenever desired. Alerts also can be configured (e.g., by the customer) to provide a rapid indication of one or more of the performance metrics exceeding a threshold. The metrics may include latency and/or error rate metrics, and may include individual latency and error rate metrics for each of the above-identified communication points. Based on these metrics, the customer is able to quickly determine whether the load balancer and/or the backend instances are experiencing a performance degradation, and whether such performance degradation is unique to the customer's load balancer and backend instances or whether the degradation is more likely pervasive across the service's provider web services platform. In addition, the disclosed embodiments can automatically determine and locate the source of a performance problem based on the metrics and initiate resolution of the problem (e.g., instantiate additional resources to address a latency problem).

The disclosed embodiments provide performance metrics for client requests as well as for separate "synthetic" requests. A client request is from a client of the customer desiring access to the customer's application. Synthetic requests are not from clients of the customer and are generated to target, for example, certain pages of a customer's website hosted by the service provider. The synthetic request exercises the target page to ensure, for example, that the code implementing that specific page is operational. In some embodiments, one source of synthetic requests may be controllable by the customer, while another source of synthetic requests are controllable by the service provider instead of the customer. All requests (client and both types of synthetic requests) are provided to the load balancer. The customer-controllable synthetic requests are distributed by the load balancer to the customer's application instances. The service provider-controllable synthetic requests are distributed by the load balancer to a service provider instance controllable by the service provider, not the customer. Thus, all three types of requests flow through the same load balancer, but the client requests and the customer-controllable synthetic requests are distributed to the customer's application instances, while the service provider-controllable synthetic requests are provided to a separate service provider instance. As such, the metrics computed based on all of these requests and their response are usable to help diagnose whether a problem exists with the entire web services platform which will likely impact multiple customers, or just with the customer's own application instances.

FIG. 1 shows a schematic diagram of a system 100 by which customers of a service provider are able to have their application and storage needs met by the hardware and software resources provided by the service provider. Customers of the service provider are able to access a web services platform 102 to create and manage services which are usable by clients 110 of the customers. For example, a customer may want its website to be hosted on the web services platform 102, thereby avoiding the need for the customer to own and operate its own server computers, switches, routers, etc. and related software infrastructure (e.g., operating systems, databases, etc.).

The web services platform 102 communicates with an application programming interface ("API") requestor 116 and one or more clients 110 via the Internet 105. The API requestor 116 is a management entity, usable by customers, that provides control information to the web services platform 102, and receives status information from the web services platform 102. The API requestor 116 may be a management console presented in a web browser executed by a computer, a command line interface executed by a computer, an automated management system or script executed by a computer, etc. The clients 110 are computing devices that request services from an application executed by the web services platform 102. A computing device suitable for use as an API requestor 116 or client 110 may be a desktop computer, a laptop computer, a tablet computer, a smartphone, or other type of computing device.

The domain name service ("DNS") server 134 stores DNS records that may include network addresses (e.g., internet protocol ("IP") addresses) of servers that correspond to domain names. For example, DNS server 134 may receive hypertext transfer protocol ("HTTP") requests from clients 110 for IP addresses via which services provided by the web services platform 102 may be accessed. On receipt of such a request, the DNS server 134 may perform a look-up function and return IP addresses to the clients 110. The clients use the returned IP addresses to access the applications 126.

The web services platform 102 includes a plurality of computers arranged to execute applications 126 that provide services to the clients 110. The web services platform 102 includes a plurality of computers 120 (120A, 120B, 120C, etc.). The web services platform 102 may execute multiple instances of each application 126 to provide a desired quality of service to the clients 110. The web services platform 102 executes each instance of the application 126 in a virtual machine 122B. Each virtual machine 122B is executed by a computer 120B. As each additional instance of the application 126 is created, the web services platform 102 allocates a computer 120B to the application, creates an instance of the virtual machine 122B on the computer 120B, and executes the instance of the application 126 on the virtual machine 122B. By varying the number of instances of application 126 executing on a virtual machine 122B, the web services platform 102 can scale the computing resources dedicated to the application 126 as needed to provide a desired quality of service. In some embodiments, scaling of the virtual machines 122B and applications 126 may not be implemented.

To control routing of requests received from the clients 110 to the instances of the application 126, the web services platform 102 instantiates a networking device such as a load balancer 124. The examples provided herein describe the use of a load balancer 124, but the principles apply to any type of networking device (e.g., load balancers, forward proxies, reverse proxies, network address translators, etc. The load balancer 124 is executed in a virtual machine 122A by a computer 120A. The load balancer 124 distributes request traffic to the applications 126 using any of a variety of algorithms. Examples of load balancing algorithms include random distribution, round robin distribution, or least outstanding request distribution. In the least outstanding request algorithm a highest priority is given by the load balancer 124 to the application 126 having the fewest outstanding requests to process. The load balancer may take into account various factors, such as an application's reported load, recent response times, number of active connections, geographic location, number of requests an application has recently been assigned, etc.

The web services platform 134 includes a management service 140 that permits customers to create and manage application instances and load balancers. The management service 140 includes an API server 142, a data store 144, an event queue 146, a workflow server 148, and a health service 150. The API server 142 receives requests from the API requester 116 and configures the management service 140 to execute the requests. For example, the API server 142 may receive an API request to create a load balancer 124, modify the load balancer 124, configure the load balancer 124, etc. On receipt of a request from the API requestor 116, the API server 142 may store parameters received as part of the request in the data store 144. The data store 144 provides persistent storage for parameters of the load balancer 124. Parameters received as part of a request may include parameters for configuring the load balancer 124. For example, the parameters may include an amount of computing resources to reserve for use by the load balancer 124. The API server 142 also may store an event flag in the event queue 146 to indicate that an operation is to be performed with respect to the load balancer 124. The event queue 146 stores flags that trigger the workflow server 148 to perform an operation.

The workflow server 148 manages the load balancer 124 based on the information stored in the data store 144. For example, the workflow server 148 may create a virtual machine 122A and an instance of the load balancer 124 as needed to route requests received from the clients 110, modify existing instances of the load balancer 124, etc. based on the information stored in the data store 144. The workflow server 148 monitors the event queue 146 for flags indicating that an operation affecting the load balancer 124 is to be performed. If the workflow server 148 reads an event flag from the event queue 146, the workflow server 148 may perform operations to configure the load balancer 124 as indicated by the parameters stored in the data store 144.

The communication between clients 110 and application 126 may use a multi-layer approach such as those common to Internet traffic. An application protocol such as the HTTP may be used. Further, a transport layer protocol such as the Transmission Control Protocol ("TCP") also may be used. TCP operations may be divided into multiple phases—connection establishment, data transfer, and connection termination. A TCP connection is established between the load balancer 124 and each instance 126 for the load balance to be able to forward a request to each such instance. Another TCP connection is subsequently established for the instance 126 to send back a response.

A log 130 also is provided for capturing detailed information for some or all requests made to the load balancer 124. A separate log 130 may be provided for each load balancer 124. As separate customers will have instantiated separate load balancers 124, the information contained in each log 130 pertains to the client requests associated with the particular customer that instantiated the corresponding load balancer 124.

Figure 2:
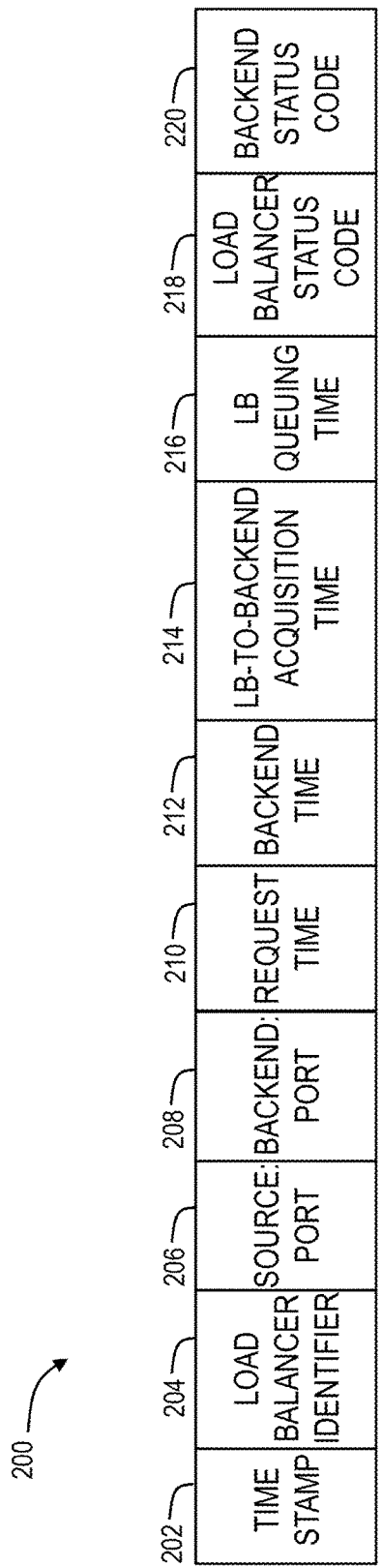
FIG. 2 shows an example of an entry in a log containing status data pertaining to individual requests processed by the service provider's web service platform in accordance with various implementations.

The load balancer 124 creates a log and then adds an entry in the log 130 for each request that passes through the load balancer. Periodically, the load balancer 124 sends the log 130 to health service 150. FIG. 2 shows an example of a log entry 200. The log entry in this example includes a time stamp 202, the load balancer identifier (e.g., name) 204, a source:port 206, a backend:port 208, a request time value 210, a backend time value 212, load balancer-to-backend acquisition time value 214, a load balancer queuing time value 216, a load balancer status code 218, and a backend status code 220.

The time stamp 202 is a time-based value that corresponds to the time that the load balancer 130 receives the initial request from a client 110 (or from a synthetic request generator as explained below). Although the time stamp 202 may be specified in any of a variety of forms, in one example, the time stamp is specified in the form of Universal Coordinated Time ("UCT") time including date and time specified in fractions of a second. Each load balancer 124 has a load balancer identifier 204 which may be specified by the customer upon creating the load balancer instance or specified by the service provider. The source:port 206 may include the IP address and the port of the source entity (e.g., client 110) that submitted the request to the load balancer 124. The backend:port 208 includes the IP address of the backend instance that processed the request. The backend instance may be a customer application 126 or the service provider instance 175 (explained below).

The request time value 210 is the total elapsed time (e.g. in seconds) from the time the load balancer 124 receives the request to the time the load balancer sends the request to the appropriate application 126. The backend time value 212 is the total elapsed time (e.g., in seconds) from the time the load balancer 124 sends the request to an application 126 to the time the instance begins sending the response back to the load balancer. The load balancer-to-backend acquisition time value 214 is the elapsed time required to establish a network connection (e.g., TCP) between the load balancer 124 and the application 126. Once the load balancer 124 receives the response from the application 126, the load balancer may temporarily store the response in an internal queue pending establishment of a connection back to the client 110 that originated in the request. The load balancer time value 216 is the elapsed time during which the response is stored in the load balancer's queue. One or more of the various elapsed time values 210, 212, 214, and 216 across multiple requests and corresponding responses can be averaged together to compute an average latency across multiple requests.

The load balancer status code 218 is an HTTP status code of the response from the load balancer 124 to the client 110. The load balancer status code 218 may indicate that no error was detected by the load balancer 124 with the request or that an error occurred. Examples of errors the status code 218 can encode include: bad request (400) and internal server error (500). Similarly, the backend status code 220 indicates an HTTP status code of the response from the application 126 to the load balancer 124. In some embodiments, both the load balancer status code 218 and backend status code 220 across multiple requests and corresponding responses can be examined to detect whether an error occurred with a request and its response for purposes of calculating an error rate.

Different or additional information may be stored in each entry in the log 130 as well. Examples of such additional information include the size of the request (e.g., number of bytes), the size of the response, and the type of request itself (e.g., GET, PUT, POST, DELETE, etc.).

Referring again to FIG. 1, the load balancer 124 causes an entry to be created in the log 130 for each request. As shown in FIG. 2 and explained above, each such entry includes latency values and status codes for a given request. By processing the latency values and status codes across multiple requests, average or percentile latencies and error rates can be computed. Detecting upward trends in such average or percentile latencies or error rates may be indicative of a problem warranting attention. The problem, however, may be systemic to the service provider's web services platform 102 as a whole, or may be localized to an individual customer. An example of a localized problem may be that the customer's client traffic is simply too voluminous relative to the number of the applications 126 that the customer has instantiated or their performance level. The average or percentile latency and error rate metrics that are calculated help to identify the source of the problem. The health service 150 or another service can use the calculated metrics to determine the source of a problem and initiate actions (such as instantiate additional resources) to solve the problem to thereby increase performance of the customer's instances. For example, if it is determined that the customer's applications 126 are experiencing higher than expected latency (higher than historical levels, higher than a predetermined threshold, etc.), but not for the service provider instance 175, then it may be determined that a performance problem is occurring that is unique to the customer. In such a case, the health (or other) service 150 may cause an additional application 126 to be instantiated for the customer or upgrade the existing applications 126 to higher performance instances. In various embodiments, the system automatically computes performance metrics, identifies problem spots and takes remedial actions to address such issues.

In various embodiments the collection of the latency values and status codes as well as the computation of the average or percentile latency and error rates is performed as a background process while the customer's load balancer 124 and applications 126 are running That is, no manual processing of data in the logs 130 is required to compute the relevant metrics. Instead, the health service 150 may access the log 130, compute at least some of the average or percentile latency and error rate metrics, and provide the average or percentile latency and error rate metrics to a user interface (e.g., a graphical user interface) whenever the customer wants to see such metrics.

All references herein to average latency metrics may include percentile latency metrics as well. For example, a ninetieth percentile latency metric refers to a latency value that is larger than 90% of all other latency values.

In some embodiments, the health service 150 may generate an alert whenever one or more of the computed performance metrics (e.g., average latency metric, error rate metric) exceeds a threshold. The alert may be visual (e.g., pop-up warning on a console, an email, a text message, etc.) and/or audible to the customer.

Referring again to FIG. 1, the system 100 also includes a customer-controllable synthetic request generator 160. This customer-controllable synthetic request generator 160 generates requests that are syntactically consistent with the requests from the clients 110. The customer-controllable synthetic requests can be configured to target specific services within the customer's application 126. The customer has control over the generation of the synthetic requests. Such control may include the timing and frequency as to when the customer-controllable synthetic requests are generated and sent to the application 126, the volume of such requests that are sent, the content of the requests, which portions of the customer's website the requests should target, etc. The customer-controlled synthetic request generator 160 may comprise an online service to which the customer 114 registers. The synthetic request generator 160 can be associated with the load balancer 124 by, for example, the customer providing the load balancer with any or all of an IP address, uniform resource locator ("URL"), customer credentials, etc. of the customer-controllable synthetic request generator. As indicated by arrow 123 in FIG. 1, some or all of the customer-controllable synthetic requests from the customer-controllable synthetic request generator 160 follow the same path as the requests from the clients 110. That is, the customer-controllable synthetic requests flow through the load balancer 124 to the applications 126. However, some of the customer-controllable synthetic requests may bypass the load balancer 124 and flow directly to the applications 126 as indicated by arrow 127 in FIG. 1.

The customer-controllable synthetic request generator 160 also may include a log 162 into which the generator 160 stores information about each customer-controllable synthetic request it generates and response it receives back. Each customer-controllable synthetic request may include a header to facilitate the calculation of a latency and error rate for each communication layer. Based on the information in the log 162, the customer-controllable synthetic request generator 160 can generate metrics for the average latency and error rate as part of the process of establishing TCP connections between the customer-controllable synthetic request generator 160 and the load balancer 124.

The web services platform 102 includes a service provider-controllable synthetic request generator 170 which also generates synthetic requests. In various embodiments, the service provider-controllable synthetic request generator 170 in the web services platform 102 is not controllable by the customer, and instead is controllable by the service provider. The service provider-controllable synthetic request generator 170 is a service that is provided by the service provider to assist in diagnosing network performance problems. The service provider-synthetic request generator 170 can be associated with the load balancer 124 by, for example, the customer providing the load balancer 124 with any or all of an IP address, URL, customer credentials, etc. of the service provider-synthetic request generator 170. As for the customer-controllable synthetic requests, the service provider-controllable synthetic requests are syntactically consistent with the requests from the clients 110 and can be configured to target various portions of the customers' applications.

The service provider-controllable synthetic requests follow a different path than for the client requests and the customer-controllable synthetic requests. The service provider-controllable synthetic requests flow from the service provider synthetic request generator 170 to the load balancer 124. The load balancer 124, however, does not forward the service provider-controllable synthetic requests to the customer's applications 126. Instead, the load balancer 124 forwards the service provider-controllable synthetic requests to the service provider instance 175. The service provider instance 175 is configured and controlled by the service provider, not the customer.

The load balancer 124 is configured to identify the service provider-controllable synthetic requests so as to forward such synthetic requests to the service provider instance 175, rather than to the customer's applications 126. Any of multiple techniques can be employed by the load balancer 124 to differentiate service provider-controllable synthetic requests from client and customer-controllable synthetic requests. In one example, the service provider-controllable synthetic request generator 170 generates each service provider-controllable synthetic request to include metadata information in, for example, a header field of the synthetic request that is recognizable by the load balancer 124 as being associated with the service provider-controllable synthetic request generator 170. In another example, the service provider-controllable synthetic request generator 170 uses a particular "IP" address that is known to the load balancer 124. The IP address may be one of multiple IP addresses (e.g., a range of IP addresses) assigned to the service provider-controllable synthetic request generator 170. In any case, upon detecting receipt of a service provider-controllable synthetic request, the load balancer 124 forwards the request to the service provider instance 175. A log 176 may be provided and associated with the service provider instance 175. Log data, such as that described above, may be stored in the log 176 by the service provider instance 175.

As for the customer-controllable synthetic request generator 160, the service provider-controllable synthetic request generator 170 also may include a log 172 into which the generator 170 stores information about each service provider-controllable synthetic request generated. Based on the information in the log 172, the service provider-controllable synthetic request generator 170 can generate metrics for the average latency and error rate as part of the process of establishing TCP connections between the service provider-controllable synthetic request generator 170 and the load balancer 124.

As explained above, the load balancer 124 creates an entry in the log 130 for each request passing through the load balancer and, among other items of information, each entry includes latencies and status codes for individual requests and responses. For the service provider-controllable synthetic requests, the request latency 210 (FIG. 2) is the time that elapses between the time the load balancer 124 receives the synthetic request to the time the load balancer sends the synthetic request to the service provider instance 175. Further, for service provider-controllable synthetic requests, the backend time value 212 is the total elapsed time from the time the load balancer 124 sends the request to the service provider instance 175 to the time the service provider instance 175 begins sending the response back to the load balancer. For the service provider-controllable synthetic requests, the load balancer-to-backend acquisition latency 214 is the time required to establish a TCP connection between the load balancer 124 and the health service provider instance 175 in order for a response to be communicated back to the load balancer. The response from the service provider instance 175 may be sent back to the service provider-controllable synthetic request generator 170.

The load balancer 124 determines status codes and latencies for at least three types of requests that flow through the load balancer—client requests, customer-controllable synthetic request, and service provider-controllable synthetic requests. In some embodiments, the latency values and status codes for each request type are processed separately to compute average latency metrics and error rate metrics. That is, a set of average latency and error rate metrics is determined based only on entries in the log 130 that correspond to client requests. Similarly, average latency and error rate metrics are determined based only on the customer-controllable synthetic requests. Average latency and error rate metrics are also determined based only on the service provider-controllable synthetic requests.

The different types of requests (client requests, customer-controllable synthetic requests, and service provider-controllable synthetic requests) can be differentiated in the log 130 by, for example, the source:port 206. The source:port 206 for customer-controllable synthetic requests will have a particular IP address and port number known to the health service 150 as being associated with the service provider-controllable synthetic request generator 170. Instantiating the service provider's synthetic request generator 170 may include configuring the service provider-controllable synthetic request generator 170 to use a particular IP address and port number. The IP address and port number then may be provided to the health service 150. Similarly, an IP address and port number for the customer-controllable synthetic request generator 160 also may be provided to the health service 150 as part of the process by which a customer configures the customer-controllable synthetic request generator 160. Thus, the health service 150 can be aware of the existence of the service provider-controllable synthetic request generator 170 and the customer-controllable synthetic request generator 160, as well as their IP addresses and port numbers. In some embodiments, all entries in the log 130 with source:port values other than those for the service provider-controllable synthetic and the customer-controllable synthetic requests are deemed to be associated with client requests.

In some embodiments, the health service 150 may access the data in logs 130, 162, 172, and 176 to compute or otherwise obtain the various average latency and error rate metrics separately for each request type. For example, the health service 150 may access log 130 to retrieve the data in the various entries and use the data to compute the following performance metrics. The application protocol layer below may include HTTP.

Error rate of load balancer 124 application protocol layer for client requests Error rate of load balancer 124 application protocol layer for customer-controllable synthetic requests Error rate of load balancer 124 application protocol layer for service provider-controllable synthetic requests Error rate of backend application 126 application protocol layer for client requests Error rate of backend application 126 application protocol layer for customer-controllable synthetic requests Error rate of backend application 126 application protocol layer for service provider-controllable synthetic requests Average request latency of load balancer 124 for client requests Average request latency of load balancer 124 for customer-controllable synthetic requests Average request latency of load balancer 124 for service provider-controllable synthetic requests Average backend latency of backend application 126 for client requests Average backend latency of backend application 126 for customer-controllable synthetic requests Average backend latency of backend application 126 for service provider-controllable synthetic requests Average load balancer-to-backend acquisition latency for client requests Average load balancer-to-backend acquisition latency for customer-controllable synthetic requests Average load balancer-to-backend acquisition latency for service provider-controllable synthetic requests In some embodiments, an average latency metric of the time it takes to establish a TCP connection between the customer-controllable synthetic request generator 160 and the load balancer 124 may be computed by the customer-controllable synthetic request generator 160 and provided to the health service 150. In other embodiments, the health service 150 may access the log 162 of the customer-controllable synthetic request generator 160 to obtain the data contained therein and compute for itself the average latency metric of the time it takes to establish a TCP connection between the customer-controllable synthetic request generator 160 and the load balancer 124. The same is true for the average latency of the time it takes to establish a TCP connection between the service provider-controllable synthetic request generator 170 and the load balancer 124. That is, in one embodiment, the average latency metric of the time it takes to establish a TCP connection between the service provider-controllable synthetic request generator 170 and the load balancer 124 may be computed by the service provider-controllable synthetic request generator 170 and provided to the health service 150. In other embodiments, the health service 150 may access the log 172 of the service provider-controllable synthetic request generator 170 and log 176 to obtain the data contained therein and compute for itself the average latency metric of the time it takes to establish a TCP connection between the service provider-controllable synthetic request generator 170 and the load balancer 124.

FIG. 3 shows an example of a user interface 400 which reports the various performance metrics calculated by system 100. The customer may access the health service 150 to be provided with the user interface 300 on a web browser of a computer accessed by the customer. An example of such hardware is provided in FIG. 5 and discussed below.

The illustrative user interface 300 provides an error rate portion 302 and a latency portion 322. Each of the error rate and latency portions 302, 322 include error rate and latency metrics computed for the three different types of requests discussed herein—client requests 304, customer-controllable synthetic requests 306, and service provider-controllable synthetic requests 308. For each request type 304-308, the user interface 300 in this example provides up to four columns 310, 312, 314, and 316 of performance metrics. The computed metrics shown in the example of FIG. 3 includes average latency metrics and error rate metrics for different message types and also include metrics for the establishment of network connections as well as for sending requests across such network connections.

Column 310 includes error rate and latency metrics associated with the establishment of TCP connections between clients 110 (or the two synthetic request generators 160, 170) and the load balancer 124. In the example of FIG. 3, 0% error rate 330 indicates that none (or a trivial number) of the TCP connections established between the customer-controllable synthetic request generator 60 and the load balancer 124 resulted in an error. As another example, the 2 millisecond (ms) latency metric 332 indicates that TCP connections established between the customer-controllable synthetic request generator 60 and the load balancer 124 took an average of 2 ms to be established. In this example, there is no error rate nor latency reported for the establishment of the TCP connections between the clients 110 and the load balancer for the client requests. Log 130 may not have sufficient data to be abled to compute these particular performance metrics. In other embodiments, log 130 can include sufficient TCP connection times and status codes for the health service 150 to be able to compute and display such metrics.

Column 312 includes error rates and latency metrics for the processing by the load balancer 124 of the incoming requests. In this example, 0% of the client and service provider-controllable synthetic requests processed by the load balancer 124 resulted in an error, while 3% of the customer-controllable synthetic requests resulted in an error. The latency metrics in column 312 may include the average of the request times 210 (time between the load balancer 124 receiving a request to the time it sends the request to a backend instance) for each type of request. In this example, the client requests, customer-controllable synthetic requests, and service provider-controllable synthetic requests were processed on average by the load balancer in 0.5 ms, 0.4 ms, and 0.5 ms, respectively.

The performance metrics in columns 314 and 316 are similar to those of columns 310 and 312. Column 314 includes latency metrics for each request type computed for the establishment of TCP connections between the load balancer 124 and the backend instance (application 126 or service provider instance 175). No error rates are provided in the example of FIG. 5 because the log 130 in some embodiments does not contain sufficient error code information to be able to compute error rates for the TCP connections. In other embodiments, the log 130 may include sufficient information for the health service 150 to compute such error rates.

Column 316 includes error rates and latency metrics for the processing of requests by the backend instance. In the example of FIG. 3, the client requests and customer-controlled synthetic requests resulted on average in a 7% error rate and a 15% error rate, respectively, while the error rate for the service provider-controllable synthetic requests had a 0% error rate. The disparity in error rates between the client and customer-controllable synthetic requests (which the load balancer distributes the customer's applications 126) and the service provider-controllable synthetic request (which the load balancer distributes to the service provider instance 175) may indicate that there is no systemic problem with the service provider's web service platform 102. Instead, the problem in this example appears to be with the customer's own application 126. The latency metrics in column 316 also shows a much higher average latency for the customer's application 126 (85 ms and 50 ms) than for the service provider instance 175 (2 ms).

Figure 4:
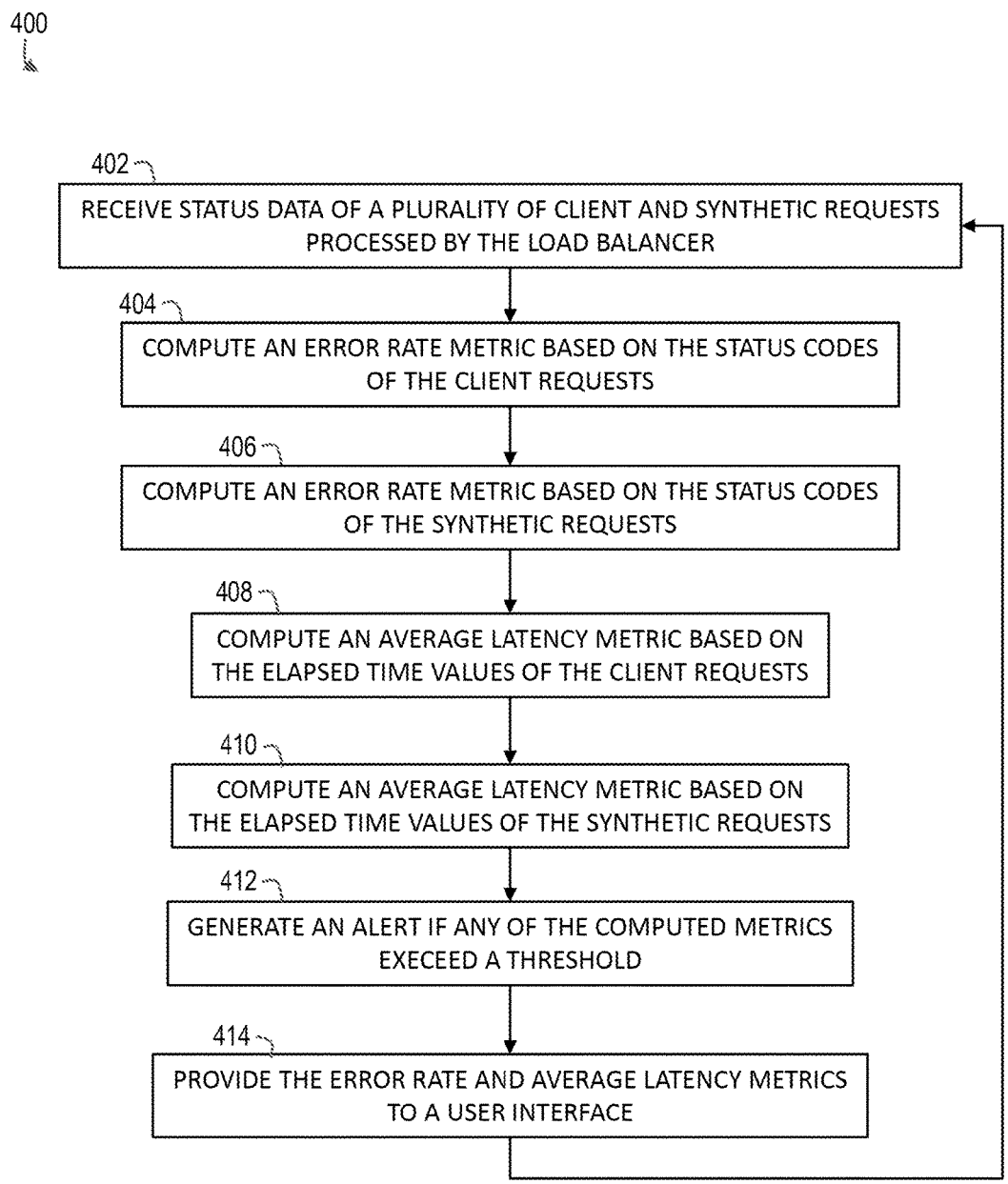
FIG. 4 shows a user interface for providing the metrics in accordance with various implementations.

FIG. 4 illustrates a method 400 for computing the metrics for the various request types to monitor a network such as the web service platform 102. The operations shown in FIG. 4 can be performed in the order shown, or in a different order. Further, two or more of the operations may be performed in parallel instead of sequentially. The method may be performed iteratively. That is, the method repeats as indicated by control looping from operation 416 back to operation 402. The method is also performed automatically, that is, without involvement of the customer. The operations may be performed by suitable hardware, such as that illustrated in FIG. 5 and discussed below.

The method 400 includes the load balancer 124 receiving multiple requests including at 402 receiving status data of a plurality of client and synthetic requests processed by the load balancer 124. The synthetic requests may include either or both of customer-controllable synthetic requests and service provider-controllable synthetic requests. The status data may include status codes and elapsed time values, such as those described previously. The status codes and elapsed time values may be obtained from any or all of the logs 130, 162, 172, and 176 by, for example, the health service 150.

At 404, the method includes computing by, for example, the health service 150, an error rate metric based on the status codes of the client requests. The status codes are provided in each entry in the log 130 as the load balancer status code 218 and the backend status code 220. The health service 150 identifies those entries in the log 130 that pertain to client requests. This identification can be made by examining the source:port 206 of each entry. As explained above, source:port values for client requests are distinguishable from source:port values associated with the various synthetic request generators (e.g., customer-controllable synthetic request generator 160 and service provider-controllable synthetic request generator 170). For the identified client requests in the log 130, the health service 150 determines the total number of client requests in the log as well as the number of client requests that have status codes indicative of an error. The health service 150 may be configured with a list of which status codes are indicative of an error and which are not. Based on these determinations, the health service 150 then computes the error rate metric for the client requests, that is, the percentage of total client requests that resulted in some type of error.

At 406, the method includes computing an error rate metric based on the status codes of synthetic requests (either or both of the service provider-controllable synthetic requests and the customer-controllable synthetic requests). Those entries in the log 130 that contain status data associated with synthetic requests are identifiable based on, for example, the source:port 206 as explained previously. The total number of synthetic requests is determined as well as the number of synthetic requests that have a status code indicative of an error. Based on these determinations, the health service 150 then computes the error rate for the service provider-controllable synthetic requests, which is the percentage of total service provider-controllable synthetic requests that resulted in some type of error. Additionally or alternatively, the various synthetic request generators 160, 170 may compute the error rate and latency metrics of their corresponding requests and provide the computed metrics to the health service 150.

For either or both of the error rate metric computations of operations 404 and 406, the method may include computing error rates for individual types of errors. For example, for a synthetic request generator 160, 170 to send a request to the load balancer 124, the synthetic request generator establishes a transport protocol layer (e.g., TCP) connection with the load balancer. The attempt to establish the TCP connection may result in an error that is tracked by the corresponding synthetic request generator 160, 170. By way of an additional example, if an error occurs while the load balancer 124 attempts to establish a TCP connection to a backend instance (e.g., application 126 or service provider instance 175), a corresponding error is also tracked. By way of yet an additional example, if an error occurs with the load balancer's ability to forward an incoming request to a backend application 126 or service provider instance 175, the load balancer 124 may store a corresponding error code as a load balancer status code 218. Similarly, the response from the backend instance may indicate that an error occurred by the instance in processing the request. The load balancer may store a corresponding error code as a backend status code 220. Moreover, the load balancer status code 218 and the backend status code 220 may indicate some degree of specificity as to the nature of the error, which is useful in diagnosing a problem.

At 408, the method includes computing an average latency metric based on the elapsed time values of the client requests. As shown in the log entry example of FIG. 2, each entry has multiple elapsed time values—a request time value 210, a backend time value 212, a load balancer-to-backend time value 214, and a load balancer queuing time value 216. An average latency metric may be computed for each of these elapsed time values. That is, the health service 150 may average the request time values 210 from among the client requests in the log 130 to compute an average request latency metric. The health service 150 also may average the backend time values 212 from among the client requests to compute an average backend latency metric. The health service 150 may average the load balancer-to-backend acquisition latencies 214 from among the client requests to compute an average load balancer-to-backend acquisition latency metric. The health service 150 may average the load balancer queuing latencies 216 from among the client requests to compute an average load balancer queuing latency metric.

At 410, the health service 150 computes an average latency metric based on the elapsed time values of the synthetic requests. An average latency metric may be computed for each of the elapsed time values 210, 212, 214, and 216 associated with customer-controllable synthetic requests and/or the service provider-controllable synthetic requests.

An upward trend or a spike in the computed metrics may be indicative of performance degradation of the load balancer 124, the customer's application instances 126 or the service provider's web services platform 102. At 412, an alert is generated if any of the metrics exceeds a corresponding threshold which may be configurable by the customer or hard-coded. An unusually large increase in either or both of the average backend latency metric and the average load balancer-to-acquisition latency metric for the client and/or customer-controllable synthetic requests may be indicative of performance degradation of the customer's application instances 126. An unusually large increase of the average backend latency metric and the average load balancer-to-acquisition latency metric for the service provider-controllable synthetic requests may be indicative of performance degradation of the service provider instance 175. Comparing the various metrics may indicate whether a degradation in performance of the customer's application instances 126 is unique to the customer or whether the service provider's web services platform 102 overall is experiencing a problem across multiple customers. For example, an upward trend in the average backend latency metric and the average load balancer-to-acquisition latency metric for the client and/or customer-controllable synthetic requests, but not in the corresponding metrics for the service provider-controllable synthetic requests may indicate that the customer's application instances 126 are experiencing a problem that is not pervasive to other customers' instances.

At 414, the various computed metrics are provided to a user interface. An example of a user interface is shown in FIG. 3. Control then loops back to operation 402 and the method repeats. The iteration time interval for method 400 can be set to any suitable value such as once every 10 seconds, per minute, once every 5 minutes, etc. Providing the metrics to the user interface will occur whenever the customer desires to access the user interface and thus is updated iteratively as long as the user interface is open on the customer's computer. The health service 150 may be accessed by the customer to view the user interface.

Figure 5:
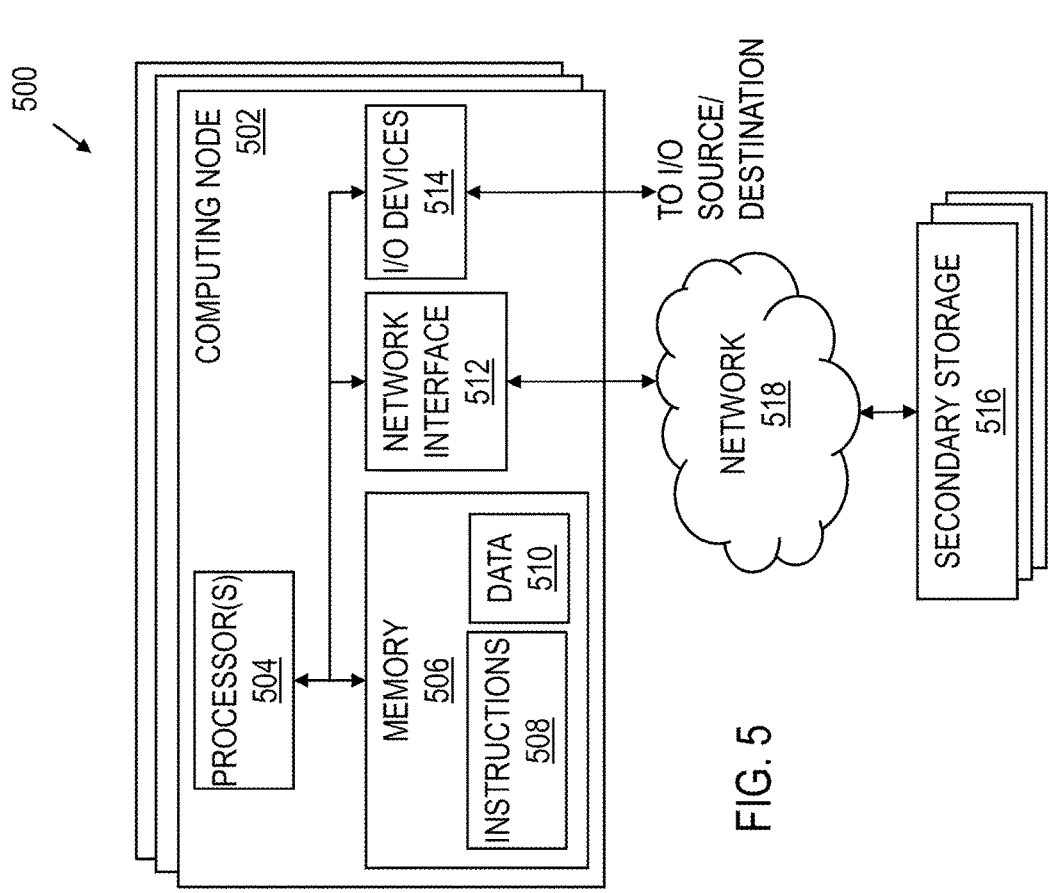
FIG. 5 is a block diagram of computing node in accordance with various implementations.

FIG. 5 shows a schematic diagram for a computing system 500 suitable for implementation of the web services platform 102, including the functionality to compute the various performance metrics described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be applied to provide the functionality of the web services platform 102, including the load balancer 124, applications 126, the management service 140, the workflow server 148, the API server 142, the data store 144, the event queue 146, the health service 150, the customer-controllable synthetic request generator 160, the service provider-controllable synthetic request generator 170, service provider instance 175, etc.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The memory 506 may include a no transitory, computer-readable storage device configured to store program instructions 508 and/or data 510 accessible by processor(s) 504. The system memory 506 may be implemented using any suitable memory technology, such as static random access memory ("SRAM"), synchronous dynamic RAM ("SDRAM"), nonvolatile/Flash-type memory, or any other type of memory. Program instructions 508 and data 510 implementing the functionality disclosed herein are stored within system memory 506. For example, instructions 508 may include instructions that when executed by processor(s) 504 implement the load balancer 124, the management service 140, the workflow server 148, the API server 142, the data store 144, the event queue 148, and/or other components of the web services platform 102 disclosed herein.

Secondary storage 516 may include volatile or nonvolatile storage and storage devices for storing information such as program instructions and/or data as described herein for implementing the web services platform 102. The secondary storage 516 may include various types of computer-readable media accessible by the computing nodes 502 via the network 518. A computer-readable medium may include storage media or memory media such as semiconductor storage, magnetic or optical media, e.g., disk or CD/FWD-ROM, or other storage technologies. Program instructions and data stored on the secondary storage 516 may be transmitted to a computing node 502 for execution by a processor 504 by transmission media or signals via the network 518, which may be a wired or wireless network or a combination thereof.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, lice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, Internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

What is claimed is:

1. A non-transitory computer-readable medium storing instructions that when executed on a computing system cause the computing system to:
   configure a networking device to distribute client requests among a plurality of application instances of a customer running in a service provider network;
   associate a service provider-controllable synthetic request generator with the networking device, the service provider-controllable synthetic request generator configured to send service provider-controllable synthetic requests to the networking device, and wherein the networking device is configured to receive and distribute client requests to a selected one of the application instances and to receive and distribute the service provider-controllable synthetic requests to a service provider instance over which customers have no control;
   compute error rate and average or percentile latency metrics of the client requests and compute separate error rate and average or percentile latency metrics of the service provider-controllable synthetic requests while the networking device distributes the requests to the respective instances;
   provide the computed error rate and average or percentile latency metrics to a user interface;
   determine a source of a problem based on at least one of the compute error rate metric and the computed average or percentile latency metrics; and
   cause a change in a configuration of the service provider network.

2. The non-transitory storage device of claim 1 wherein the program instructions, when executed by the computing system, cause the computing system to:
   associate a customer-controllable synthetic request generator with the networking device, the customer-controllable synthetic request generator configured to send customer-controllable synthetic requests to the networking device, and wherein the networking device is configured to receive and distribute the customer-controllable synthetic requests to a selected application instance; and compute error rate and average or percentile latency metrics of the customer-controllable synthetic requests separate from the client requests and the service provider-controllable synthetic requests.

3. The non-transitory storage device of claim 2 wherein the program instructions, when executed by the computing system, cause the computing system to provide the following metrics to the customer interface:
an average or percentile latency metric computed of the elapsed time that the networking device takes from receiving each client request to beginning to send each client request to an application instance;
an average or percentile latency metric computed of the elapsed time that the networking device takes from receiving each service provider-controllable synthetic request to beginning to send each such service provider-controllable synthetic request;
an average or percentile latency metric computed of the elapsed time that the networking device takes from receiving each customer-controllable synthetic request to beginning to send each such customer-controllable synthetic request;
an error rate metric computed of the client requests as processed by the application instances;
an error rate metric computed of the service provider-controllable synthetic requests as processed by the service provider instance; and
an error rate metric computed of the customer-controllable synthetic requests as processed by the application instances.

4. A system, comprising:
a plurality of computing nodes, each computing node comprising a processor and memory coupled to the processor, wherein the computing nodes comprise:
a networking device configured to receive requests directed to application instances, to distribute the requests across the application instances, and, for each request, to determine a status code and an elapsed time value and store the status codes and elapsed time values for the request in a log; and
a health service configured to provide error rate and average or percentile latency metrics based on a plurality of the request status codes and elapsed time values from the log;
wherein the error rate and average or percentile latency metrics comprise a first set of error rate and average or percentile latency metrics associated with the networking device and a second set of error rate and average or percentile latency metrics associated with the application instances; and
wherein the computing nodes further comprise a service to determine a source of a performance problem based on the error rate and average or percentile metrics and to cause an additional resource to be instantiated.

5. The system of claim 4 wherein:
the computing nodes further comprise a synthetic request generator configured to provide synthetic requests to the networking device; and
the networking device is configured to forward the synthetic requests to a service provider instance over which customers have no control.

6. The system of claim 5 wherein the health service is configured to compute average or percentile latency based on elapsed time values and error rate of the synthetic requests forwarded by the networking device to the service provider instance.

7. The system of claim 4 wherein the requests include client requests, service provider-controllable synthetic requests, and customer-controllable synthetic requests.

8. The system of claim 7 wherein the health service is configured to compute error rate and average or percentile latency metrics for the client requests, error rate and average or percentile latency metrics for the service provider-controllable requests, and error rate and average or percentile latency metrics for the customer-controllable synthetic requests.

9. The system of claim 7 wherein the health service computes the error rate and average or percentile latency metrics.

10. The system of claim 7 wherein the networking device is configured to distribute the service provider-controllable synthetic requests to a service provider instance and to distribute the customer-controllable synthetic requests across the application instances.

11. The system of claim 10 further comprising a service provider-controllable synthetic request generator configured to generate the service provider-controllable synthetic requests and compute an average or percentile latency and an error of attempts to establish a transport protocol connection between the service provider-controllable synthetic request generator and the networking device.

12. The system of claim 4 wherein the health service is configured to determine whether an error rate value or an average or percentile latency value exceeds a threshold and, if the threshold is exceeded, to generate an alert.

13. The system of claim 4 wherein each of the average or percentile latency metrics and the error rate metrics include:
a metric for establishing a network connection; and
a metric for sending a request across the network connection.

14. A method for monitoring a network, comprising:
iteratively and automatically, receiving status data of a plurality of client and synthetic requests processed by a networking device, the status data including status codes and elapsed time values; and
for each iteration:
computing an error rate metric based on the status codes of the client requests;
computing an error rate metric based on the status codes of the synthetic requests;
computing an average or percentile latency metric based on the elapsed time values of the client requests;
computing an average or percentile latency metric based on the elapsed time values of the synthetic requests; and
wherein the method further comprises, based on the computer metrics, determining a source of reduced performance in the network and causing a change in a configuration of the network.

15. The method of claim 14 wherein iteratively receiving status data of a plurality of client and synthetic requests processed by a networking device includes receiving status data of a plurality of customer-controllable synthetic requests.

16. The method of claim 15 wherein iteratively receiving status data of a plurality of client and synthetic requests processed by a networking device includes receiving status data of a plurality of service provider-controllable synthetic requests, which are not controllable by a customer.

17. The method of claim 15 wherein iteratively receiving status data of a plurality of client and synthetic requests processed by a networking device includes receiving status data of a plurality of service provider-controllable synthetic requests and wherein the method further includes:
- distributing the client requests to application instances configurable by a customer;
- distributing the customer-controllable synthetic requests to the application instances; and
- distributing the service provider-controllable synthetic requests to a service provider instance that is not configurable by the customer.

18. The method of claim 14 further comprising providing the error rates and average or percentile latencies to a user interface.

19. The method of claim 14 wherein:
- computing the error rate and average or percentile latency metrics of the client requests includes computing error rate and average or percentile latency metrics of the client requests as processed by a networking device and computing error rate and average or percentile latency metrics of the client requests as processed by application instances; and
- computing the error rate and average or percentile latency metrics of the synthetic requests includes computing error rate and average or percentile latency metrics of the of the synthetic requests as processed by the networking device and computing error rate and average or percentile latency metrics of the synthetic requests as processed by the application instances.

* * * * *